Patented Oct. 26, 1926.

1,604,126

UNITED STATES PATENT OFFICE.

HERBERT A. KERN, OF CHICAGO, ILLINOIS.

SOLIDIFIED WATER-SOFTENING COMPOUND.

No Drawing. Application filed September 24, 1924. Serial No. 739,685.

This invention relates to water softening compounds and more particularly to such compounds as may be made available in various solid forms by the processes of this invention.

It has been found that certain sodium aluminate solutions which are now commercially available provide a desirable water softening material under many conditions, especially for the precipitation of carbonates and other materials causing temporary hardness in water supplies.

One of the objects of this invention is to provide an inexpensive method of supplying sodium aluminate mixtures for water softening purposes in solid form, either as a dry powder, or in the form of sticks or cakes.

It is a further object of this invention to provide such mixtures without the necessity of evaporating moisture from the relatively inexpensive and easily available sodium aluminate solutions.

In carrying out the above purposes, a further object is accomplished by the addition to the sodium aluminate solutions of another useful water softener which is particularly effective in treating water for permanent hardness.

Further objects of this invention comprise the provision of a solid water softener of the above indicated type which may be quickly and substantially entirely dissolved in the water supply; and furthermore to provide a water softener which may be universally used for clarifying and softening water supplies of various types and degrees of hardness without the addition to the water of any inactive or undesirable materials.

Further objects will be apparent from the following specification and claims relating to my invention.

In practicing my invention I prepare, for example, a product comprising sodium aluminate which has many of the virtues of the ordinary commercially available solutions and yet which is available in a non-liquid or substantially wholly solid form. Under many circumstances the use of a solid is, of course, much more convenient than is the use of a liquid water softener.

In preparing the compound involving this invention, I preferably utilize inexpensive solutions of sodium aluminate which are now available as by-products of certain industrial processes. The composition of such solutions may vary between fairly wide limits, but a typical solution of this type may contain in the neighborhood of 16% dry weight of sodium aluminate, 8% soda ash, 10% caustic soda, 5% of other impurities, and 39% of water. In order to render such a solution available as a solid, and without the necessity of evaporating the moisture therefrom, I preferably add thereto a sufficient quantity of an anhydrous material such as soda ash, in order to absorb the solvent as water of crystallization.

By adding two parts of soda ash to one part by weight of the above sodium aluminate solution a dry powder is obtained which may be readily handled, stored and measured for use in water softening plants. If substantially equal quantities by weight of the solution and soda ash are associated together, a solid moldable product may be formed. This mixture may be conveniently run into molds of the desired shape where it will set by itself and provide either sticks or cakes in a form which may be conveniently handled.

It will be noted that by adding the soda ash for solidifying the sodium aluminate, a further object is accomplished in that the soda ash will provide a valuable water softening component of the product for treating permanent hardness, as by precipitating sulphates from the water. Thus it will be seen that the sodium aluminate solution may be solidified from its commercially available and inexpensive form without the use of heat and without the addition of substances which would be of no further use in the product.

I have found that this product, both in its powdered and molded forms, is quickly and substantially completely dissolved when used in water softening plants. The amount of this compound which it is advisable to add to a water supply will of course depend upon the character and degree of hardness of the water treated.

While I have described above in detail one embodiment of my invention, it will be understood that various changes and substitutions of equivalents may be made without departing from the scope and purpose of my invention as set forth in the appended claims. While I prefer to treat commercial sodium aluminate solutions for example, with the anhydrous materials, it will be understood that other water softening solutions may be treated in a similar manner, not only with soda ash, but by other available anhydrous or partially anhydrous materials which will accomplish the desired results.

Having described my invention, what I claim as new and desire to secure by Letters Patent of the United States is:

1. The method of making a soluble water softening compound in non-liquid form from a sodium aluminate solution which comprises adding thereto a sufficient quantity of soda ash to take up the solvent as water of crystallization.

2. The method of forming a soluble water softening compound in solid form from a sodium aluminate solution which comprises first adding thereto a sufficient quantity of soda ash to absorb the solvent as water of crystallization, and then allowing the mixture to solidify in units of predetermined dimensions by crystallization in molds.

3. The method of forming a soluble water softening compound in non-liquid form which comprises mixing substantially equal parts by weight of soda ash and commercial sodium aluminate solution whereby the water of the solution is taken up as water of crystallization.

4. The method of forming a soluble water softening compound in non-liquid form which comprises mixing with a sodium aluminate solution at least an equal amount by weight of soda ash whereby water of the solution is taken up as water of crystallization.

5. The method of forming a soluble water softening compound in non-liquid form which comprises mixing soda ash with not more than equal amounts by weight of a commercial sodium aluminate solution, such solution containing in the neighborhood of 16% sodium aluminate and smaller amounts of sodium hydroxide and sodium carbonate.

6. The method of treating hard water which comprises dissolving therein a material of non-liquid form obtained from associating sodium aluminate solution with sufficient quantities of soda ash to take up the solvent as water of crystallization.

7. The method of treating hard water which comprises dissolving therein a substantially solid material obtainable by mixing with a sodium aluminate solution at least an equal amount by weight of soda ash whereby water of the solution is taken up as water of crystallization.

8. The method of treating hard water which comprises dissolving therein a substantially solid material obtainable by mixing soda ash with not more than equal amounts by weight of a commercial sodium aluminate solution, such solution containing in the neighborhood of 16% of sodium aluminate and smaller amounts of sodium hydroxide and sodium carbonate.

9. A soluble water softening compound in substantially solid form comprising sodium carbonate associated with the solute of a commercial sodium aluminate solution the solvent of which has been taken up as water of crystallization by the sodium carbonate.

10. A solidified soluble water softening compound comprising soda ash associated with not more than equal amounts by weight of the constituents of a commercial sodium aluminate solution, such solution containing in the neighborhood of 16% sodium aluminate, smaller amounts of sodium hydroxide and sodium carbonate and in the neighborhood of 39% of water which is absorbed as water of crystallization by the soda ash whereby the compound is solidified.

In witness whereof, I have hereunto subscribed my name.

HERBERT A. KERN.